Aug. 15, 1933. F. H. OWENS 1,922,631
MEANS AND METHOD FOR REPRODUCING SOUND FROM A PHOTOGRAPHIC FILM RECORD
Filed Sept. 17, 1928

INVENTOR.
FREEMAN H. OWENS.
BY
John C. Brady
ATTORNEY

Patented Aug. 15, 1933

1,922,631

UNITED STATES PATENT OFFICE 1,922,631

MEANS AND METHOD FOR REPRODUCING SOUND FROM A PHOTOGRAPHIC FILM RECORD

Freeman H. Owens, New York, N. Y.

Application September 17, 1928
Serial No. 306,488

10 Claims. (Cl. 179—100.3)

My invention relates to a means for reproducing sound from a photographic film record and has for its primary object an arrangement eliminating the necessity for moving the film strip past and in contact with the usual optical or mechanical slit commonly used in this art. The use of mechanical and optical slits in recording and reproducing sound photographically has heretofore caused difficulty due to the fact that the edges presented to the film strip by the slit as it moves past the same and in contact therewith tend to scratch the film and in some instances close the slit for practical purposes. It is, therefore, desirable to move the film past the slit and out of contact therewith and to this end my invention is directed. A slight separation of the slit member from the film itself very largely reduces, if it does not eliminate, the danger that the slit will become clogged with dust.

Other objects and advantages will appear as the description proceeds, with reference to the figures of the drawing forming a part of this specification and wherein like reference numerals indicate like parts.

In the drawing:—

Figure 1:
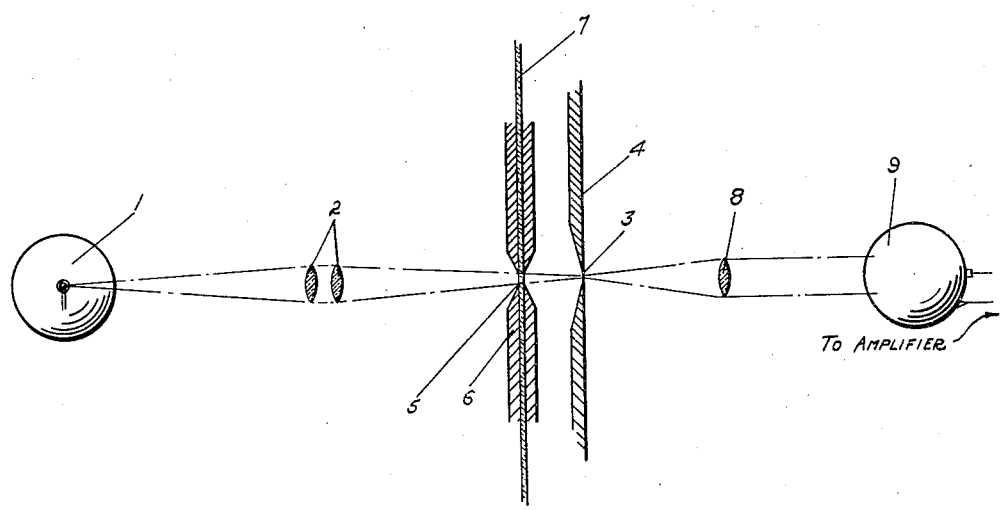
Figure 1 is a diagrammatic side view partly in section illustrating one form of my improved device.

This application is a continuation in part of my application, Serial No. 722,355, filed June 25, 1924, which application matured into Patent 1,876,025 on December 23, 1930. Fig. 1 of the said patent discloses certain thin-edged screening members arranged to restrict the effective portion of a beam of light such as would be projected through a film and onto a photo-sensitive cell. The present invention, however, goes further than the disclosure of the patent by showing the cooperation of a film gate with such beam restricting thin-edged members.

Although my invention is adapted with certain changes and arrangement of parts for use in recording sound on film, it is more particularly applicable to the reproduction of photographic sound records and it is with this reproduction that this description will proceed, the figures of the drawing illustrating the invention as applied to reproducing sound rather than the recording thereof.

Reference numeral 1 indicates a lamp or other suitable source of light of preferably constant intensity for reproducing. The light rays, as shown by the broken lines, are caught by the condenser lenses 2 and focused upon a slit 3 suitably provided in the plate or mask 4. Before reaching this slit 3, however, the light rays from the lenses 2 pass through an opening 5 in a suitable film gate 6 through which the photographic film 7 bearing the sound record moves in any suitable manner, said sound record passing the opening 5. Obviously, therefore, the light rays which reach the slit 3 are modulated in accordance with the photographic sound record upon the film 7, the latter being suitably driven at a uniform and desired rate of speed through the film gate 6.

Figure 2:
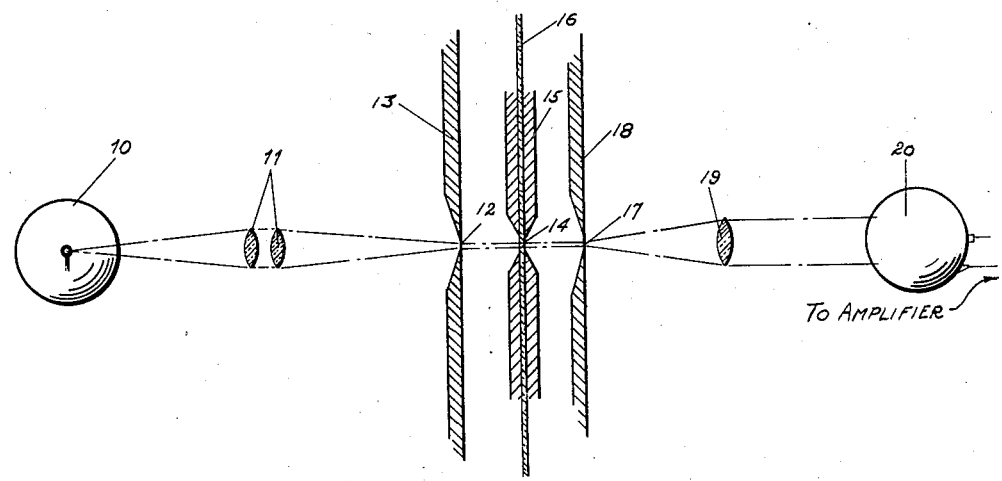
Figure 2 is a similar view illustrating a modification thereof.

It will be understood that in order to achieve the object of this invention the aperture 14 in the film guide 15 is preferably made to expose a greater area of film than would be exposed by one of the slits such as 3 or 12 or 17, otherwise the aperture 14 would also be likely to become clogged with dust, a condition which it is the very purpose of the invention to avoid. It follows, therefore, that the placing of the light-slits closely adjacent but out of contact with the film in such a manner as to restrict the beam of light as it passes through the film, constitutes a highly desirable and dependable arrangement for sound reproducing purposes. Furthermore, this restriction of the light beam by means of the slit 3 as shown in Fig. 1 or the slits 12 and 17 as shown in Fig. 2 is accomplished without the aid of a refractive system such as lenses. The lenses 2 of Fig. 1 or 11 of Fig. 2 serve to intensify the beam as it passes through the film, but these lenses play no part in restricting the beam to the very narrow transverse band of the film which is essential to faithfulness of sound reproduction. Neither do the lenses 8 or 19 contribute in any way toward this restriction, but on the other hand they serve to diffuse the effect upon the active element of the photo-cell.

The slit 3 in the member 4 is as shown clearly in Figure 1 spaced slightly away from the film gate 6 and film 7 whereby said film is entirely out of contact with said slit. The light rays, however, which pass through the slit 3 are obviously modulated in accordance with the sound record on the film. These modulated light rays after passing through the slit 3 are caught by a lens 8 and directed to a photo electric cell 9 where they are converted into electric impulses after the well known operation of cells of this kind, then suitably amplified whereupon they may be reproduced as sound by any desired loud speaker device.

The details of these features form no part of my invention and therefore have not been illustrated nor described in detail.

Figure 2 illustrates a device similar to that shown in Figure 1 but modified to the extent of providing a slit on both sides of the sound film strip. In this figure, the reference character 10 refers to the lamp corresponding to the lamp 1, the condenser lenses 11 corresponding to the lenses 2, which focus the light rays upon the first slit 12 formed in the mask or plate 13, the rays then passing through the opening 14 in the film gate 15, through which is moved the sound film 16 bearing a sound record. After passing through the film 16, the light rays, modulated as before described by the sound record, pass through a second slit 17 in the mask or plate member 18 and are caught by the lens 19 and directed upon the photo electric cell 20 for the purpose before described. It will be observed in this modification likewise the slits which govern the passage of the light rays to the photo electric cell are out of contact with the film itself.

It will be understood of course that in the drawing, the parts have been greatly exaggerated as to size and distance apart for clearness of illustration. In practice, the arrangement of the parts particularly the size of the slits and the distance thereof from the film and other elements is governed by the best results secured.

Of course, changes may be made in detail without departing from the spirit and scope of my invention. I do not limit myself, therefore, to the exact form herein shown and described other than by the appended claims.

I claim:—

1. Apparatus for reproducing sound from a photographic film record comprising a source of illumination, an apertured film-guide, a film movable past the aperture thereof, a photo-sensitive cell and thin-edged screening means for restricting the effective portion of a beam of light projected from said source of illumination through said film and onto said photo-sensitive cell, the edges of said screening means being disposed in separate planes perpendicular to the axis of said beam whereby the area of said film which at any instant intercepts said beam is less than the film area exposed by said apertured film guide.

2. Apparatus as defined by claim 1 in which said means for restricting the effective portion of said beam of light comprises a slit member closely adjacent but out of contact with said film.

3. Apparatus for reproducing sound from a photographic film record comprising a source of illumination, an apertured film guide, a film movable past the aperture thereof, a photo-sensitive cell, an optical system for refractively concentrating rays of light in a beam projected from said source of illumination through said film and onto said photo-sensitive cell and thin-edged screening means to restrict the effective portion of said beam to an area of said film less than that which is exposed through said aperture, the edges of said means being disposed in separate planes perpendicular to the axis of said beam.

4. Apparatus for reproducing sound from a photographic film record comprising a source of illumination, an apertured film guide, a film movable past the aperture thereof, a photo-sensitive cell, and non-refractive means disposed out of contact with said film for restricting the effective portion of a beam of light projected from said source of illumination through said film and onto said photo-sensitive cell, said means comprising opaque members having sharp edges by which the ineffective portion of said beam is intercepted.

5. In a device for photographically recording and reproducing sound waves, a source of illumination, and means comprising a plurality of opaque bodies lying in separate planes with opposed edges to pass light in a thin plane.

6. In a device for photographically recording and reproducing sound waves, a source of illumination, and means comprising three straight edged opaque bodies lying in separate parallel planes to permit an extremely thin plane of light through the edges of two of said members lying in the same plane.

7. In a device for photographically recording and reproducing sound waves, a source of illumination and means comprising a plurality of at least three opposed plane surfaces at least one of which is adjustable with respect to the others to pass light in a thin line the edges of the other of said member lying in the same plane.

8. In a sound reproducing and recording device, a source of illumination, means comprising three opaque plane members two of which lie in separate parallel planes on one side of the center line of the light source, and a third member on the opposite side in a plane between the other two, said third member being adjustable with respect to the other two, and the other two members having thin edges in the same plane to vary the thickness of the beam of light passed, and means for recording variations in intensity of said source of light.

9. In a sound reproducing and recording device, a source of illumination, means comprising three opaque plane members two of which lie in separate parallel planes on one side of the center line of the light source, and a third member on the opposite side in a plane between the other two, said third member being adjustable with respect to the other two, to vary the thickness of the beam of light passed, means for recording variations in intensity of said source of light and means for diffusing the said thin beam of light.

10. In a device for photographically recording and reproducing sound waves, a source of illumination, a moving film in the path of light of said source, and means in said path comprising a plurality of stationary opaque bodies lying in separate planes and spaced away from said film for passing effective light from said source in a thin plane through said film.

FREEMAN H. OWENS.